United States Patent [19]

Thompson

[11] Patent Number: 4,793,506
[45] Date of Patent: Dec. 27, 1988

[54] CLOSURE CAP WITH A SEAL AND METHOD OF AND APPARATUS FOR FORMING SUCH CLOSURE AND SEAL

[75] Inventor: Mortimer S. Thompson, Maumee, Ohio

[73] Assignee: Tri-Tech Systems International Inc., Maumee, Ohio

[21] Appl. No.: 60,217

[22] Filed: Jun. 10, 1987

[51] Int. Cl.⁴ .............................................. B65D 53/00
[52] U.S. Cl. ............................. 215/344; 215/DIG. 1; 264/295; 264/296
[58] Field of Search ................. 215/344, DIG. 1; 264/296, 295

[56] References Cited

U.S. PATENT DOCUMENTS

| | | | |
|---|---|---|---|
| 3,038,624 | 6/1962 | Wieckmann | 215/344 X |
| 3,200,981 | 8/1965 | Harding | 215/344 X |
| 3,418,409 | 12/1968 | Hesse et al. | 264/296 X |
| 4,016,996 | 4/1977 | Aichinger et al. | 215/344 |
| 4,281,979 | 8/1981 | Doherty et al. | 264/296 X |
| 4,386,044 | 5/1983 | Arndt et al. | 264/296 X |
| 4,475,274 | 10/1984 | Beckstrom | 264/296 X |
| 4,595,547 | 6/1986 | Herr | 264/295 X |

FOREIGN PATENT DOCUMENTS 788148 12/1957 United Kingdom ................ 215/344

Primary Examiner—Donald F. Norton
Attorney, Agent, or Firm—Hedman, Gibson, Costigan & Hoare

[57] ABSTRACT

In combination, a container and a linerless cap and a method of forming the cap. The cap includes plastic and has a sealing surface which is softer than contiguous plastic portions as a result of its method of forming which includes stretching. In the method the cap is molded from plastic and includes a top wall, an outer depending skirt and an internal depending substantially annular wall having an upper end integral with and depending from the top wall and a lower free end. Thereafter the free end is engaged by a forming tool to progressively turn the free end away from the internal wall to create a stretched intermediate portion for sealing which is softer than its contiguous portions.

13 Claims, 2 Drawing Sheets

CLOSURE CAP WITH A SEAL AND METHOD OF AND APPARATUS FOR FORMING SUCH CLOSURE AND SEAL

FIELD OF THE INVENTION

This invention relates to the closure cap with a seal and to a method of and apparatus for forming said closure and seal.

BACKGROUND OF THE INVENTION

The function of a closure cap to adequately seal the contents of a container against leakage from or into the container traditionally has been met by incorporating a soft liner to effect a seal between the under portion of the cap lid and the upper face of the bottle neck rim. The liner may be preformed from sheet or formed in place and is produced from materials or laminar combinations of materials which provide easy cold formability to enable the liner to conform to the individual configuration of the neck rim, including manufacturing aberrations and defects. Because of the specialized sealing function of a liner, it is typically made from softer polymers than those selected to perform the more structural cap functions of providing a strong resilient enclosure for the neck opening with a strong mechanical engagement therewith. In some instances stiffer and stronger polymers, including some which are suitable for producing threaded caps, may be expanded to produce voids and a less dense sheet having a softer, more flexible characteristic and liners may be made therefrom.

An alternative approach in popular use is a laminate of paperboard substrate with a soft sealing surface such as wax or plastic. This approach offers low cost but has performance limitations especially when moisture is present.

Because of an economic advantage, much attention has been devoted to developing caps which have an integral, "linerless" seal. The availability of such semi-rigid plastics as polypropylene and polyethylene, which combine a moderate level of strength and resilience with a moderate level of softness and conformability, has made possible popular use of caps with linerless seals. Typically, such caps employ a circular flange under the cap lid having a wedge shape cross section the lower portion of which is thin and flexible and intended to abut the top surface of the bottle neck rim in a compressive action for sealing. The wedge shape flange generally is vertical and provides a sealing area restricted to the width of the narrower more flexible portion of the wedge shape. For their effective use they depend upon a very high level of sealing force on a very limited sealing area which makes them susceptible to sealing surface imperfections and the decay of sealing force over long time periods.

Other linerless caps employ conical flanges at an angle from the vertical or with quarter-round or claw shape so that capping will cause the flanges to flex and slide out over the top surface or the neck rim thereby creating a somewhat larger sealing area than obtainable with vertical flanges in straight compression. While the larger sealing area has advantages, this is offset by the fact that the sealing pressure is at the same time reduced because of the thinness at the sealing area resulting from the severe tapers in cross section which is normally required. This limitation results from the difficulty of removing such features from an injection mold. This also results in more complex and costly mold construction and operation and also excludes the more rigid plastics from use.

Still other linerless caps employ conical flanges which engage the corners of the neck rim with the underside of the flange. Such features rely on the use of very high sealing pressure directed against a restricted contact at the rim corners to obtain sealing integrity. In such cases sealing integrity depends on container rim corners which are without blemishes as produced and which, because they are most susceptible to marring during handling, must be suitably protected from such before they are capped and sealed. Also, to the extent that the conical flanges approach the shape of a cylinder, their sealing integrity is affected by out-of-round or other common dimensional variations of the container manufacturing process or variations between manufacturers resulting from the fact that inside neck dimensions typically are not specified. And to the extent that the flanges become more conical, more complex and costly mold construction and operation result.

Still another type of linerless cap employs a plug configuration in sealing contact with the inside wall of the container neck. This type of seal has the advantage of engaging that surface of the bottle neck which may be freest from manufacturing defects and most protected from incidental marring in handling thereafter. However, wide manufacturing dimensional tolerances and the industry-wide practice of not specifying the neck bore dimension impose severe limitations in trying to obtain consistent sealing engagement and integrity. As a result, resistance to tapered plug seals can push the cap lid up to varying degrees of undesirable dome shapes. Or such plug seals can yield unacceptably wide variations in sealing engagement and pressures. Efforts to overcome such deficiencies have led to proposed designs with flanges extending radially from generally cylindrical plugs wherein the outer rim of the flange makes a narrow sealing contact with the neck bore and is supported by a cantilevered flexing action. (See, for example, U.S. Pat. Nos. 4,090,631, 4,016,996 and 4,210,251). An additional problem has been encountered with this type of linerless seal in that the lip or rim of the flange may be distorted by the neck rim during capping leading to imperfect seals. Efforts to eliminate this problem can introduce other problems specific to pressurized containers wherein blow-off or missiling of the caps can occur during uncapping. Another effort to avoid distortion of the lip or rim of such a seal is a cap design and method of producing it wherein a radially extending flange having a downward orientation as molded is hingedly "bent", "folded", or inverted into an upward orientation before it is applied to the container where sealing occurs at or adjacent the rim of the inverted flange portion and, importantly, not at the hinge. This is accomplished with extra mold portions and actions during part removal or subsequently in an appropriate fixture to hingedly invert the flange. This effort, therefore, requires the molding of a seal of complex shape utilizing a complicated and costly mold construction and molding operations followed by inverting the sealing portion of the seal hingedly to alter its orientation but not its shape.

Importantly, in all cases an inherent limitation to heretofore available linerless caps is that the sealing surface has the same plastic in the same physical state as the structural portion of the cap. This has called for a compromise in the softness and conformability of the sealing surface or in the strength of the structural cap portions, or most frequently both, with consequent limitations in the cap usefulness. That is, to achieve a softer more comformable seal, poorer thread strength must be accepted or to achieve greater thread strength, a harder, less conformable seal must be accepted.

Thus, known caps with linerless seals are beset with drawbacks and problems associated with their need to perform with container necks having imperfect sealing surfaces and wide dimensional tolerances; their limited sealing integrity based on restricted sealing area; the fact that sealing surface softness and conformability are limited; the fact that the use of more rigid plastics are not feasible; and the higher cost and complexity of mold construction and operation for a number of the proposed sealing designs.

SUMMARY OF THE INVENTION

In accordance with the present invention, there is provided a new and unique cap with a seal which develops a positive sealing pressure and engagement with a container opening upon closing the container. The cap is substantially rigid and includes plastic material and has a top wall or lid which covers the container opening. The cap has a depending skirt which engages the finish of a container or bottle for closing thereof. The seal is made from plastic and is integral with the top wall of the cap. The seal preferably is internally spaced from the peripheral skirt and includes a highly compressible sealing portion which has a conformable surface produced by stretching which is relatively softer than its contiguous portions. As the cap is applied to the container for closing, the seal engages the container finish and readily compresses to provide a relatively large sealing area to seal the contained product.

In a preferred embodiment, there is provided a linerless cap including a seal having a substantially annular upper portion integral with and depending from the lid and a substantially annular highly compressible lower portion which has a "J", "U" or other folded, creased or pleated cross section. The lower portion has a sealing surface which is softer than the rest of the cap as a result of its method of manufacture which includes stretching it. The stretched linerless seal preferably has balanced residual strain wherein the sealing surface is in a state of tension and relatively soft and compressible and the substrate or supporting structure is in a balancing state of compression and relatively hard and resistant to compression and which maintains the state of tension and relative softness of the opposing sealing surface.

In another preferred embodiment, the linerless sealing surface is relatively softer than the other cap portions as a result of altering it by the method of the invention to include microscopic voids which soften it and make it less dense and more compressible by employing plastics of the invention which exhibit this characteristic when stretched.

In a method for producing the cap and integral seal of the invention, the cap preferably is formed first by conventional molding techniques, such as injection or compression molding, with a cylindrical internal preform for the integral seal. The preform includes an annular wall which is spaced inwardly from the peripheral skirt and which is integral with and depends from the lid preferably in a vertical manner. Thereafter, the lower portion of the integral seal is formed by forming means which bends, folds, creases, plates or otherwise manipulates and stretches it to achieve the desired softness. The lower portion may be formed by a folding tool which engages the lower free end of the cylindrical preform, and turns it outwardly toward or inwardly from the annular wall and then upwardly; channeling and altering the direction of such movement over its working surfaces. Preferably the initiation of the turning action is facilitated by providing a taper to the lower free end of the cylindrical preform. The turning/folding action preferably reversely folds the annular wall to produce a tightly configured "J" or "U" shape in such free end.

To facilitate the turning operation or to alter the dimensions, shape or character of the resultant linerless seal, the linerless seal preform or the folding tool may be heated. The tool may be used in straight compression with the free end, with or without spinning, or it may be rolled along its periphery. The free end of the cylindrical preform may also be reformed or folded simultaneously or sequentially.

A feature of the invention is that very high degrees of softness can be achieved for linerless cap sealing surfaces without compromising the strength and rigidity characteristics of the remainder of the cap including threaded portions.

Another feature of the invention is that significant depths of softness can be achieved in the substrate below the sealing surface to assure high sealing performance on container sealing surfaces having significant imperfections.

Another feature of the invention is that the sealing portion can have a surface of the highest levels of softness with progressively lower levels or softness and higher levels of resilience in the substrate, thereby offering a higher level of sealing performance under more challenging conditions of temperature and/or pressure differentials than sealing portions with uniform softness throughout.

Still another feature of the invention is its low cost manufacturing methods using low cost molds and molding operations and low cost reforming machinery and operations.

BRIEF DESCRIPTION OF THE DRAWINGS

The following is a detailed description together with accompanying drawings of illustrative embodiments of the invention. It is to be understood that the invention is capable of modification and variation apparent to those skilled in the art within the spirit and scope of the invention.

DETAILED DESCRIPTION OF THE INVENTION

Figure 1:
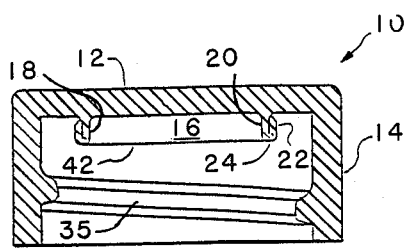
FIG. 1 is a longitudinal sectional view of a cap of the invention.
Figure 2:
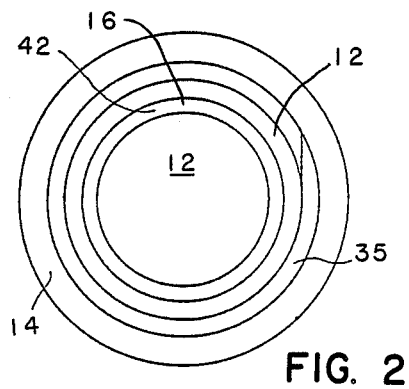
FIG. 2 is a bottom plan view of the cap of FIG. 1.
Figure 3:
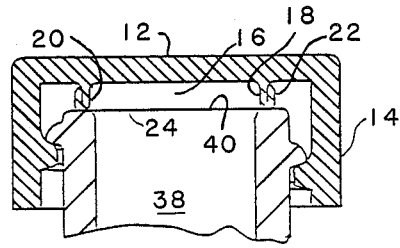
FIG. 3 is a longitudinal sectional view of the cap of FIG. 1 in sealing engagement with a container neck.

Referring to FIGS. 1 to 3, there is shown a semi-rigid, plastic cap 10, having a lid 12, a depending peripheral skirt 14 including an internal thread 35 and an internal integral or linerless seal 16. The illustrated integral seal 16 includes a cylindrical or annular vertical wall 18 having an upper end 20 integral with the lid 12 and a free end 22 with a reversely folded or bent portion 24. As shown, the end 22 of the integral seal 16 is folded outwardly and upwardly and forms an annular double walled ring seal 16. The portion 24 has a lower sealing surface 42 which is softer than contiguous portions of the cap 10 as a result of the method for its production which stretches it. FIG. 3 shows the cap 10 with the surface 42 in sealing engagement with a rim 40 of a neck 38 of a container or bottle.

Figure 5:
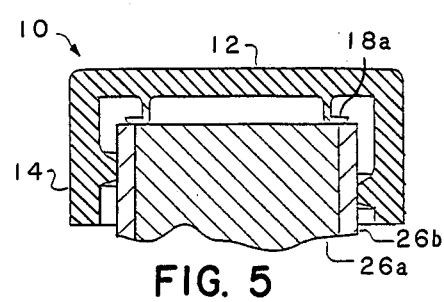
FIG. 5 is a longitudinal sectional view of the cap of FIG. 4 in early engagement with a reforming tool of the invention.
Figure 6:
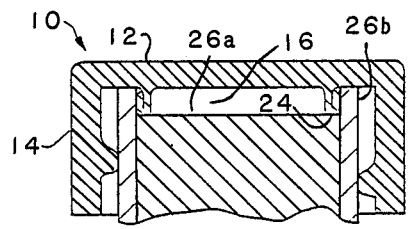
FIG. 6 is a longitudinal sectional view of the cap and reforming tool of FIG. 5 after formation of the linerless seal of the invention.
Figure 4:
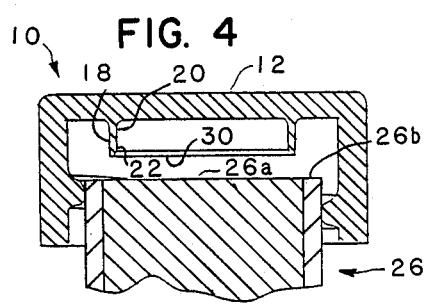
FIG. 4 is a longitudinal sectional view of a cap preform before reforming to create the linerless seal of the invention shown in FIG. 1.

Referring to FIGS. 4 to 6, there is shown a preferred method of the invention for forming the lower sealing portion 24 of the seal 16 of FIGS. 1 to 3.

In FIG. 4 the cap 10 already has been formed by conventional molding techniques, such as injection molding, with a vertical cylindrical or tubular wall 18 having its upper end 20 integral with the lid 12 end and with its lower free end 22 ready for folding by the illustrated folding tool 26.

FIG. 5 shows the tubular wall 18 of the cap illustrated by FIG. 4 in early engagement with a folding tool 26. The folding tool 26 has an interior component 26a and a concentric exterior component 26b. FIG. 5 shows that the tubular wall 18 has been engaged and turned outwardly by tool component 26a to form a horizontal wall portion 18a. The outward horizontal direction of the wall portion 18a upon compression by tool component 26a is facilitated by an outwardly directed taper to the free end 22 at rim 30. The tape preferably extends from rim 30 at an angle and for a distance sufficient to assure a positive outward turning of the perihery of the wall 18. For a typical folded portion 24 of the invention having a width of 0.050 inches employing an annular thickness thereat of about 0.015 to 0.020 inches, the taper may extend a distance of about 0.015 to 0.060 inches from the rim 30. Optionally the top surface of interior tool component 26a may be beveled downwardly and outwardly or wall 18 may be molded with a conical or outwardly flaired free end to assure the outward direction of wall portion 18a. FIG. 6 shows how the horizontal wall portion 18a is turned upwardly to produce the folded portion 24 and the "U" shape of linerless seal 16 by suitably interrupting the travel of tool component 26a and continuing the travel of tool component 26b. The folded linerless seal 16 produced by this method can be a "J" shape or can be extended to a "U" shape by employing suitable dimensions for wall 18 or tool 26 and/or by adjusting the amount of compression of wall 18 by tool 26. The cessation of travel of tool component 26a relative to tubular wall 18 and tool component 26b may be abrupt, but preferably it is gradual to facilitate formation of the folded sealing portion 24. Optionally, the tool components 26a and 26b may be employed to do their respective portions of the folding operation at separate work stations. Another option is to fold the free end 22 inwardly by suitable alteration of the taper of the wall at free end 22 and the dimensions and sequence of operation of tool components 26a and 26b.

To facilitate the folding operation, in the case of polypropylene, the tool 26 may be at a temperature of about ambient to 300 degrees F. but preferably about ambient to 150 degrees F. or curling cycles of about one-half to three seconds. Lower temperatures and faster cycles are preferred to maximize the desired strain of the invention imposed by the folding operation on the plastic of the curl 24 as discussed hereinafter with respect to FIGS. 7 to 11.

The preferred folding method of the invention illustrated by FIGS. 4 to 6 produces a linerless seal 16 which possesses a desired large sealing area at the fold which preferably ranges up to about 0.080 inch radially, although it can also be advantageously used for restricted sealing areas of under 0.030 inch. In addition, the reforming method modifies the physical properties of the plastic in such a way as to further enhance its sealing characteristics. That is, the plastic at the sealing surface 42 of the seal is made softer and more comfortable and at the substrate and supporting portion is made stronger, more resilient and creep resistant as a result of the stresses imposed on the plastic during the folding operation.

Figure 7:
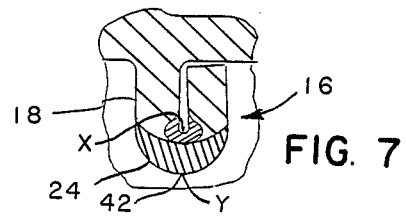
FIG. 7 is an enlarged sectional view of the linerless seal and adjacent cap portion shown in FIGS. 1 and 6 schematically illustrating the strain in the seal created by the method of the invention.
Figure 8:
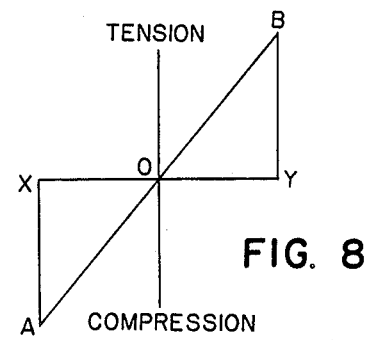
FIG. 8 is a graph schematically illustrating the balance of strain illustrated in FIG. 7.

Referring now to FIGS. 7 and 8, the folding operation, by imposing an alternative shape on the preformed cylindrical wall 18 also imposes balanced residual stresses and stress differentials to the resultant shape in the seal 16. That portion of the seal 16 which is stretched is in extension or a state of tension and that portion which is compressed is in a state of compression. The level of stress varies with the degree of extension or compression and, as in any static condition the total amount and direction of each kind of stress balances and maintains the other.

The balanced residual stresses occur in the direction of the fold as a result of the extension and compression of the preform cylindrical wall 18 across its thickness to form the folded sealing portion 24, as shown in FIG. 7. At and near the convex exterior sealing surface 42 represented by point Y, the plastic is stretched in the direction of the fold and is in a state of high residual tension. The opposing concave interior surface, represented by point X is compressed in the direction of the fold and is in a state of high residual compression which balances and maintains the state of tension at or near the exterior convex surface. FIG. 8 shows the direction, sum and approximate distribution of these stresses across the thickness of the plastic including the neutral point 0 and points of maximum compression and tension at or near the inner and outer surfaces. In the normal practice of the invention maximum tensile stress will occur over a finite distance from the surface. The sum of the compressive stress defined by points AOX equals that of the tensile stress defined by the points BOY. The high state of tension at point Y and the remainder of the sealing surface 42 weakens it and makes it softer in that a much lower level of added tension is required to reach and exceed its yield point wherein deformation is easily achieved. In this regard a normally stiffer and stronger plastic behaves like a softer and weaker plastic. In the same manner the high state of compression at point X makes the plastic there stiffer, stronger and more creep resistant.

Figure 9:
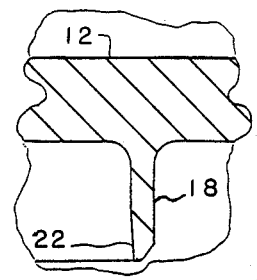
FIG. 9 is an enlarged sectional view of the linerless seal preform and adjacent cap portion shown in FIG. 4.
Figure 10:
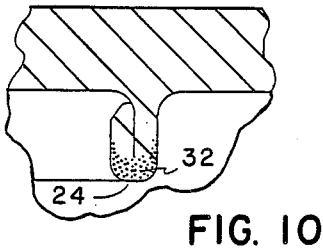
FIG. 10 is an enlarged sectional view of the linerless seal and adjacent cap portion shown in FIGS. 1 and 6 illustrating the microscopic voids created by the method of the invention.
Figure 11:
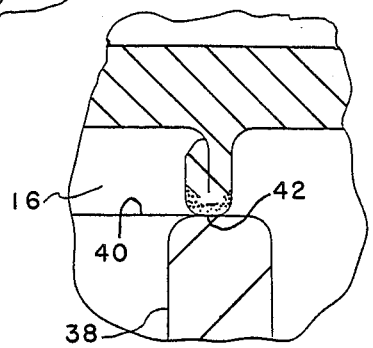
FIG. 11 is an enlarged sectional view of the linerless seal and adjacent cap portion with the container neck shown in FIG. 3 illustrating the reduction in microscopic voids resulting from their compressive sealing engagement.

Referring to FIGS. 9 to 11, there is shown a feature of the invention wherein the sealing surface is softened as a result of the production of microscopic voids thereat by employing plastics which form such voids upon stretching. FIG. 9 shows the wall 18 of FIG. 4 integral with lid 12 and including free end 22 prior to folding. FIG. 10 shows the folded sealing portion 24 of FIG. 6 including microscopic voids 32 produced during the folding operation which preferably is done at ambient temperatures to facilitate the creation of the voids. The size and/or number of the voids 32 are in relationship to the degree to which the plastic has been stretched. FIG. 10 shows that the void formation is greater where the plastic has been stretched most at the bottom of the folded or "U" shape. FIG. 11 shows the seal 16 with its surface 42 employed as a rim seal in compression against the rim 40 of a container neck 38 with the resultant reduction and elimination of the voids 32 in the seal area at and adjacent the sealing surface.

Thus, it can be seen that the folding process of the invention used to create the desired shape modifies the physical properties of the plastic at the sealing surface from those of a more rigid, unyielding material desired for overall cap strength and integrity to those of a softer, more yielding and conformable material desired for improved sealing characteristics.

Figure 12:
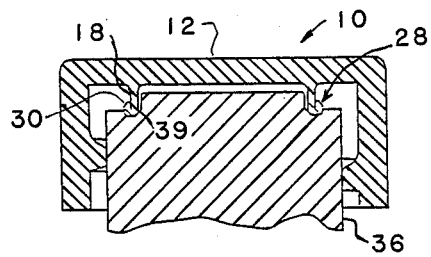
FIG. 12 is a longitudinal sectional view of the preform cap of FIG. 4 in early engagement with another reforming tool of the invention.
Figure 13:
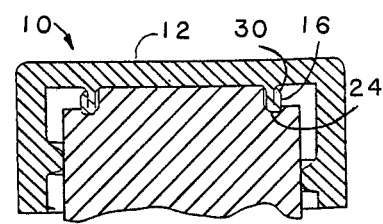
FIG. 13 is generally the same as FIG. 12 except that the completed linerless seal has been formed.

Referring to FIGS. 12 and 13, there is shown another preferred method of forming the folded sealing portion 24 of the seal 16 wherein the fold is not as sharply creased as with the seal 16 of FIGS. 1 to 11. In this method, the folded portion 24 of the seal 16 is formed with a curling tool 36 which in FIG. 12 is in early compressive engagement with the wall 18 of cap 10 of FIG. 4. The curling tool 36 includes a circular or annular groove 28 having a concave cross section suitable for shaping and dimensioning the gently folded or tightly curled portion 24 to produce a "J" or "U" shape, preferably having an overall width about three times the thickness of the wall 18 thereat. Preferably the radius of the curl should be small enough compared to the width of wall 18 so that the rim 30 cannot loop back towards the wall 18 to form an "O" shape thereby creating a gently folded portion 24.

As shown in FIG. 12, the forming operation is accomplished by pressing the groove 28 of the tool 36 against the rim 30 of the wall 18. In this embodiment the deepest portion 33 of the groove 28 representing the center of its concavity is located outwardly of the cylindrical plane of the wall 18 to assure its turning outwardly. Also the groove 28 has a slanted portion 39 inwardly and tangent to its concavity to facilitate centering of the tool and cap. As movement of tool 36 relative to the wall 18 continues toward the lid 12, the cylindrical sides of the wall 18 are centered within groove 28 by the slanted portions 39 and are then force outwardly and then upwardly to assume a interim "J" shape as shown in FIG. 12. As this relative movement continues, the rim 30 is forced upwardly out of groove 28, thereby producing the desired tight "U" shape sealing portion 24 and seal 16 shown in FIG. 13 having a stretched and softened sealing portion 24.

In the ease of a 28 mm polypropylene cap typical dimensions of the folded sealing portion 24 of seal 16 are about 0.020 to 0.100 inches in width and about 0.007 to 0.030 inches in wall thickness and the radial cross section preferably forms an arc or a continuous curve of about 180 degrees. Preferably the preform wall 18 is vertical where the portion or surface 24 is produced upon folding to achieve the greatest degree of stretching and softening. Preferred dimensions for the folded sealing portion 24 to provide maximum plastic property enhancement through imposed stresses by practice of the present invention call for maximum wall thickness and minimum folded width and maximum applied curvature.

Cap sizes may typically range from under 20 mm to 120 mm and bottle and/or jar sizes range from under 2 ounce to 128 ounce capacity. Larger capacity containers such as drums or kegs are also suitable for the practice of the invention as are smaller vials and other containers.

Useful plastics which can be used for forming the caps and linerless seals of the invention include polypropylene, polyethylene, polystyrene, acrylonitrile - styrene - butadiene polymers, and other semi-rigid to rigid plastic materials. Optionally other plastics employed in the practice of the invention are chosen from the group of plastics which have in common the fact that when stretched beyond their tensile yield point they develop microscopic voids or fissures within the plastic which serve to lower its density, soften it and make it more compressible, even when residual tensile strain is not present. The group of plastics manifesting this behavior includes essentially all polymer classes (e.g., polystyrene, polyvinyl chloride, polyolefins, polycarbonates, polysulfones, polyesters, nylons, etc.) and preferably are selected from the group of plastics known as alloys, blends, multipolymers, multiphase polymers or other nomenclature, many of which are listed in Modern Plastics Encyclopedia, 1986–1987, pages 105 to 111. Exmples of such polymers are ethylene-propylene copolymers (e.g., Himont SB781) and rubber modifed polystyrene (e.g., Monsato Lustrex 4300), the entire disclosure of which is incorporated by reference. Typically a plastic which produces microscopic voids in stretching (e.g., Shell 7522 polypropylene copolymers produces voids in the range of about 0.25 to 3.0 microns).

The linerless seals of the present invention can be used in a wide variety of caps such as continuous or discontinuous thread, snap, vacuum, dispensing and child resistant caps and can include combinations with other materials (e.g., caps having metal lid portions or portions utilizing different plastic than that used for the seal). Such linerless seals may be used to close and seal a wide variety of containers for a wide variety of products including: beverages, including carbonated soft drinks and pasteurized beverages such as beer; foods, especially those where container sealing performance is critical, including oxygen sensitive ones such as mayonnaise, peanut butter and salad oil, and including corrosive ones such as vinegar and lemon juice; and household chemicals, including bleaches and detergents, drugs and cosmetics and other products requiring the highest integrity seal and reseal under the widest range of distribution and use conditions.

Further, the linerless seals of the present invention can be used in conjunction with other types of linerless seals including other type seals of the invention and may employ various or all surfaces on or about the neck rim 40.

The invention in its broader aspects is not limited to the specific described embodiments and departures may be made therefrom within the scope of the accompanying claims without departing from the principles of the invention and without sacrificing its chief advantages.

I claim:

1. A method of forming a cap including a linerless seal comprising:
   molding a cap from plastic having a top wall, and a depending wall within the cap comprising plastic and having an upper end extending from said top wall to a lower free end, and
   turning said lower free end away from said depending wall to pre-stretch the inner surface of the said lower free end at the turn to provide a preformed sealing surface at said turn which is softer than its contiguous unstretched portions and which upon subsequent sealing engagement said preformed softened sealing surface at said turn is adapted to compress and seal.

2. The method of claim 1, wherein the inner pre-stretched, softened sealing surface at said turn has a cross sectional shape selected from the group consisting of a U, V or J.

3. The method of claim 1, wherein said lower turned free end at said turn is formed by a method selected from the group consisting of bending, creasing or pleating to provide said pre-stretched, softened sealing surface at said turn of the bend, crease or pleat.

4. The method of claim 1, wherein said pre-stretched, softened, sealing surface at said turn is in a state of tension.

5. The method of claim 1, wherein said stretched, softened sealing surface includes microscopic voids.

6. The method of claim 1, wherein said stretched, softened, sealing surface is in a state of tension and includes microscopic voids.

7. A cap formed by the method of claim 1.

8. The cap of claim 7, wherein said pre-stretched, softened, sealing surface at said turn is in a state of tension and includes microscopic voids.

9. The cap of claim 7 in combination with a container.

10. A cap for a container having a linerless seal, comprising:
    a depending wall within the cap comprising plastic and having a lower free end turned away from said depending wall with a pre-stretched sealing surface at the turn which is softer than its contiguous unstretched portions and which upon subsequent sealing engagement said preformed softened sealing surface is adapted to compress and seal.

11. The cap of claim 10, wherein said inner, pre-stretched, softened sealing surface at said turn has a cross sectional shape selected from the group consisting of U, V, or J.

12. The cap of claim 10, wherein said pre-stretched, softened, sealing surface at said turn is in a state of tension.

13. The cap of claim 10, wherein said stretched, softened, sealing surface at said turn includes microscopic voids.

* * * * *